(12) United States Patent
Hirschman et al.

(10) Patent No.: US 8,594,026 B1
(45) Date of Patent: Nov. 26, 2013

(54) DISCOVERING RESOURCES TO FACILITATE PREREGISTRATION WITH A WIRELESS COMMUNICATIONS NETWORK

(75) Inventors: Brent B. Hirschman, Overland Park, KS (US); Jeremy R. Breau, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1289 days.

(21) Appl. No.: 12/133,964

(22) Filed: Jun. 5, 2008

(51) Int. Cl.
*H04W 4/00* (2009.01)
*H04W 36/00* (2009.01)

(52) U.S. Cl.
USPC ........... 370/329; 370/331; 370/334; 455/436; 455/439

(58) Field of Classification Search
USPC ........................................ 370/329
See application file for complete search history.

(56) References Cited

U.S. PATENT DOCUMENTS

| | | | |
|---|---|---|---|
| 7,010,300 B1 * | 3/2006 | Jones et al. | 455/439 |
| 7,343,167 B2 * | 3/2008 | Kang et al. | 455/458 |

OTHER PUBLICATIONS 802.16e Part 16: Air Interface for Fixed and Mobile Broadband Wireless Access Systems; Amendment 2: Physical and Medium Access Control Layers for Combined Fixed and Mobile Operation in Licensed Bands and Corrigendum 1, IEEE Standard for Local and Metropolitan Area Networks, Feb. 28, 2006; http://standards.ieee.org/getieee802/download/802.16e-2005.pdf.

802.16 Part 16: Air Interface for Fixed Broadband Wireless, IEEE Standard for Local and Metropolitan Area Networks, Oct. 1, 2004; http://standards.ieee.org/getieee802/download/802.16/2004.pdf.

Unpublished application having U.S. Appl. No. 11/291,947, entitled "Method and System for Handoff Controller-Mediated Handoff of a Mobile Node," and filed on Dec. 1, 2005.

* cited by examiner

*Primary Examiner* — Afshawn Towfighi

(57) ABSTRACT

Systems, products, and methods are disclosed for preregistering with a second network a mobile device that is currently being serviced by a first network that utilizes a different wireless-communications technology than the second network. An embodiment of the method includes facilitating wireless communications with a plurality of wireless devices by way of one or more base stations that form a portion of the second network, which utilizes a first type of wireless technology; and receiving by way of a portion of the internet, and not through any of the one or more base stations, a preregistration request that was sent through the first network and that is associated with the mobile device, which is currently being serviced by the first network, the preregistration request including identifying information that is useable to identify the mobile device and further including a request to prepare the second network to service the mobile device.

22 Claims, 5 Drawing Sheets

DISCOVERING RESOURCES TO FACILITATE PREREGISTRATION WITH A WIRELESS COMMUNICATIONS NETWORK

SUMMARY

Embodiments of the present invention are defined by the claims below. But summarily, embodiments provide a way for resource-allocation components to be discovered by a dual-radio mobile device while that device is communicating via a first wireless-access technology and desires to preregister with another network of a different wireless technology without sever communications with the first network. When we speak of a "network," we generally are referring to a set a communications components that collectively facilitates communication of data according to a given wireless-access technology (e.g., CDMA, WiMAX, GSM, etc).

Consider, by way of example, a mobile device having two radios, each capable of communicating via different wireless-access technologies (say one is CDMA and the other is WiMAX for example). These radios might even be part of single component, such as part of the same chip (in which case, some skilled artisans might even refer to this as a single radio, albeit one that can operate using two different wireless-access technologies, though transmit only one at a time). Assume for the sake of this limited, cursory example that the mobile device is communicating via CDMA using the first radio. It might be the case that beginning to simultaneously transmit data using the second radio would interfere with the current communications session. In the past, a preregistration request would have had to have been sent by way of the second radio over the air so that it would reach the resource-allocation component in the second network that would ultimately allocate resources to the mobile device. Thus, sending a preregistration request could historically require a dual-transmit scenario, which is an undesirable situation in some settings. We, however, will describe a best-of-both-worlds scenario, wherein the mobile device is ultimately able to preregister with the second network, and wherein this can occur without interfering with any current communications session. We use the terms "network-access technology" and "wireless-communications technology" interchangeably.

In a first illustrative aspect, a method (or device capable of performing a method) for discovering communications-network resources to facilitate preregistration of a mobile device that has a first and second radio, each equipped to communicate with networks of a first and second wireless-communications technology is provided. Note, although we refer to first and second wireless-communications technologies, we do not necessarily mean to imply that two completely different networks are implicated. It might be the case that portions of two networks are common to both.

The method includes, in one embodiment, communicating with a first communications network (by way of the first radio) that employs a first wireless-communications technology; and receiving an indication (by way of the second radio) that a second communications network is potentially available to service the mobile device. The second communications network (including a portion of the same network that utilizes a different network-access technology) is to be communicated with by way of the second radio and employs a second wireless-communications technology that is different from the first wireless-communications technology. The method continues with sending a preregistration request (by way of the first radio and the first communications network) that will reach a resource-allocation component associated with the second communications network. The resource-allocation component can allocate resources within the second communications network to service the mobile device via the second radio. The mobile device can begin communicating through the second communications network much more quickly than if it were not able to preregister. The second network can preregister the mobile device without having to wait for the mobile device to sever communications with the first network.

In a second aspect, a method of facilitating preregistration of a mobile device includes receiving by way of the first network (1) a mobile-device identifier that is useable to identify the mobile device, and (2) a base-station identifier (or some other identifier such as a subnet ID) that is useable to identify a base station (variously referred to as a "node" by some artisans) that is useable by said second network to service the mobile device upon switching to the second network; utilizing the base-station identifier (or similar) to determine a target address to send a preregistration request; and communicating a preregistration request by way of the first network and through a portion of the internet to the target device, which is adapted to facilitate at least a portion of a preregistration process, which includes allocating resources that are to be used by the second network for it to service the mobile device without it having to separately register with the second network.

In a final illustrative aspect, a method of preregistering with a second network a mobile device that is currently being serviced by a first network that utilizes a different wireless technology than the second network is provided. The method includes facilitating wireless communications with a plurality of wireless devices by way of one or more base stations that form a portion of the second network, which utilizes a first type of wireless technology; and receiving by way of a portion of the internet, and not through any of the one or more base stations, a preregistration request that was sent through the first network and that is associated with the mobile device, which is currently being serviced by the first network, the preregistration request including identifying information that is useable to identify the mobile device and further including a request to prepare the second network to service the mobile device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| BSID | Base-Station Identifier |
| CDMA | Code Division Multiple Access |
| ESN | Electronic Serial Number |
| FDMA | Frequency Division Multiple Access |
| GPRS | General Packet Radio Service |
| GSM | Global System for Mobile Communications |
| IEEE | Institute of Electrical and Electronic Engineers |
| IM | Instant Messaging |
| MAC | Media-Access-Control |
| NAT | Network Address Translation |
| OFDMA | Orthoginal Frequency Division Multiple Access |
| RFCs | Request For Comments |
| TDMA | Time Division Multiple Access |
| WiMAX | World-Wide Interoperability for Microwave Access |

Further, various technical terms are used throughout this description. An illustrative resource that fleshes out various aspects of these terms can be found in Newton's Telecom Dictionary by H. Newton, 24th Edition (2008).

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
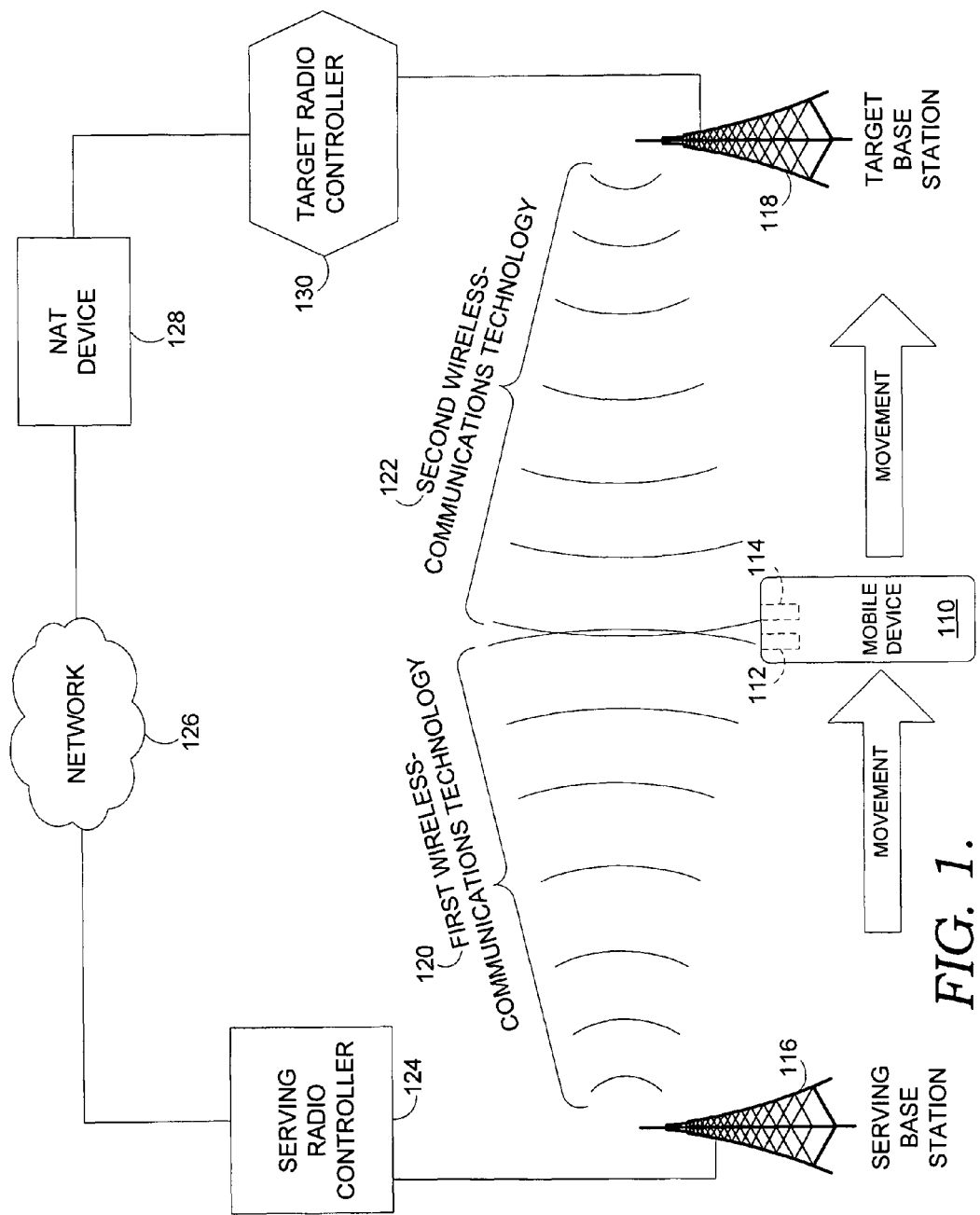
FIG. 1 depicts an illustrative operating environment suitable for practicing an embodiment of the present invention.

Turning now to FIG. 1, an illustrative operating environment suitable for practicing an embodiment of the present invention is provided and referenced generally by the numeral 100. Operating environment 100 includes a mobile device 110 that includes two radios 112 and 114. Additional radios could also be included. Each radio enables communication of a different wireless technology. We may variously refer to this as a technology type, a radio type, a radio-access type, and the like. By such terms we mean to convey that the technology of communicating data wirelessly differs from one to the other.

For example, radio 112 might enable communications by way of a technology that utilizes Time Division Multiple Access (TDMA) while radio 114 utilizes Frequency Division Multiple Access (FDMA) or Orthogonal Frequency Division Multiple Access (OFDMA). Said another way, radio 112 might be designed to communicate in accordance with a Code Division Multiple Access (CDMA) technology while radio 114 is designed to communicate utilizing GSM (Global System for Mobile Communications) or GPRS (General Packet Radio Service) technology. Of course, each radio might communicate in any variation of different protocols. For example, radio 114 might be the one that communicates in CDMA while radio 112 communicates using GSM or GPRS. One of the radios might utilize WiMAX (World-Wide Interoperability for Microwave Access) technology. When we speak of WiMAX technology, we describe a technology based on the IEEE 802.16 Standard (which is incorporated by reference herein to provide a greater disclosure of that technology), which is also called Wireless MAN. WiMAX is a technology that can be used to help enable the delivery of last-mile wireless-broadband access in one exemplary use. Another exemplary use is for WiMAX to be used to communicate data with mobile devices such as mobile phones, PDAs, computers, and the like. A standard relevant to WiMAX technology includes the 802.16E Standard promulgated by the IEEE, which is also incorporated by reference herein.

Returning to FIG. 1, we had mentioned that mobile device 110 includes two radios 112 and 114 that are adapted to communicate with disparate wireless-communications technologies. Although we listed a few illustrative wireless-communications technologies, other types of technologies are contemplated within the scope of the instant invention. Any wireless-access technology whose transmission might interfere with a transmission or possibly even reception of another type of wireless-access technology is contemplated within the scope of the instant invention. We have not attempted to list all the myriad of different possible wireless-communications technologies but have provided a few for illustrative purposes.

Wireless-communications is facilitated by way of promulgating electro-magnetic radiation. A transmitter emits electro-magnetic signals. In some cases, the power of transmitting data by way of a first wireless-communications technology interferes with transmitting other data in a second wireless-communications technology. Thus, it might be the case that transmitting data by way of radio 112 could interfere with transmitting data by way of radio 114. This physical reality might mean that mobile device 110 cannot transmit data simultaneously through radios 112 and 114. Thus, mobile device 110 would not be able to simultaneously transmit data to a serving base station 116 by way of radio 112 at the same time radio 114 is used to communicate data to a target base station 118.

Serving base station 116 communicates information according to a serving-network technology type 120. Target base station 118 communicates data according to a target-network technology type 122. We use the terms "serving" and "target" because mobile device 110 is meant to be illustrated to be physically moving in a rightward direction away from serving base station 116 and toward target base station 118. However, serving base station 116 communicates in a different wireless-communications technology than does base station 118.

Summarily, they utilize two different network-access technologies. One way this may play out is that serving base station 116 is associated with a first telecommunications carrier while target base station 118 is associated with a different carrier. Thus, in some embodiments, serving base station 116 may be a part of a network operated by a first telecommunications carrier, and target base station 118 may form part of a network that is operated by a second wireless-communications carrier. In other embodiments, the base stations are owned by the same carrier, but communicate data utilizing different technologies.

Another component that is part of a serving network includes a serving radio controller 124. In one embodiment, radio controller 124 carries out radio-resource management and can also handle mobility management functions. In some embodiments, this is the point where encryption is done before user data is sent to and from mobile device 110. Radio controller 124 can connect a circuit-switched core network (not shown) through a media gateway (also not shown) to a packet-switched network, such as network 126, which is meant to illustratively show a network such as the internet or a portion thereof. A NAT (Network Address Translation) device 128 can be employed in one embodiment to perform network-address translation on information packets that flow to and from network 126. NAT device 128 helps insulate an address of a target radio controller 130 from devices external to the target network, which will be explained in greater detail in connection with FIG. 2.

Target radio controller 130 includes the ability to allow mobile device 110 to communicate with the target network; namely, the network that mobile device 110 desires to begin communicating with so that it does not lose or have interrupted a current communication session. Illustrative communications sessions include internet access, checking email, conducting IM (Instant Messaging), or a Voice Over Packet or other type of phone call. Certain latency-sensitive applications are just that, sensitive to latencies in data communications. One way latencies in data communications can surface is when a device such as mobile device 110 has to wait to be granted access to a network. Some skilled artisans refer to this as registering with a network. Registering with a network may include various steps. Illustrative steps include resource allocation (admittance), authentication, and/or addressing (e.g., assigning an IP address to a requesting device). Other skilled artisans may refer to these steps by different names or may use these names to refer to different events. The upshot of registration is being allowed to communicate with a target network, including communicating data through the target network.

When we say "communicate" we do not merely mean receiving data by way of a broadcast channel or a pilot channel, which merely transmits an availability of a network and often a Base-Station Identifier (BSID) that identifies a source of signal (or some other identifier such as a subnet ID). Rather, we mean to convey that mobile device 110 is allowed to send data to a desired network. Often, this will include being able to send data through the target network, wherein the mobile device actually becomes a part of, or at least a node on, a desired network.

Target radio controller 130 includes an ability to register mobile device 110 so long as it was able to receive a preregistration request from mobile device 110, which has historically not been possible because while mobile device 110 is being serviced by way of a first wireless-communications technology 120. It cannot simultaneously communicate via second wireless-communications technology 122 because doing so would interfere with its current communication. We have devised, among other things, a way of enabling mobile device 110 to discover target radio controller 130, and for target radio controller 130 to discover mobile device 110. This technology enables target radio controller 130 to process a preregistration request that is associated with preregistering mobile device 110 on a target network while its being serviced by a serving network.

Figure 2:
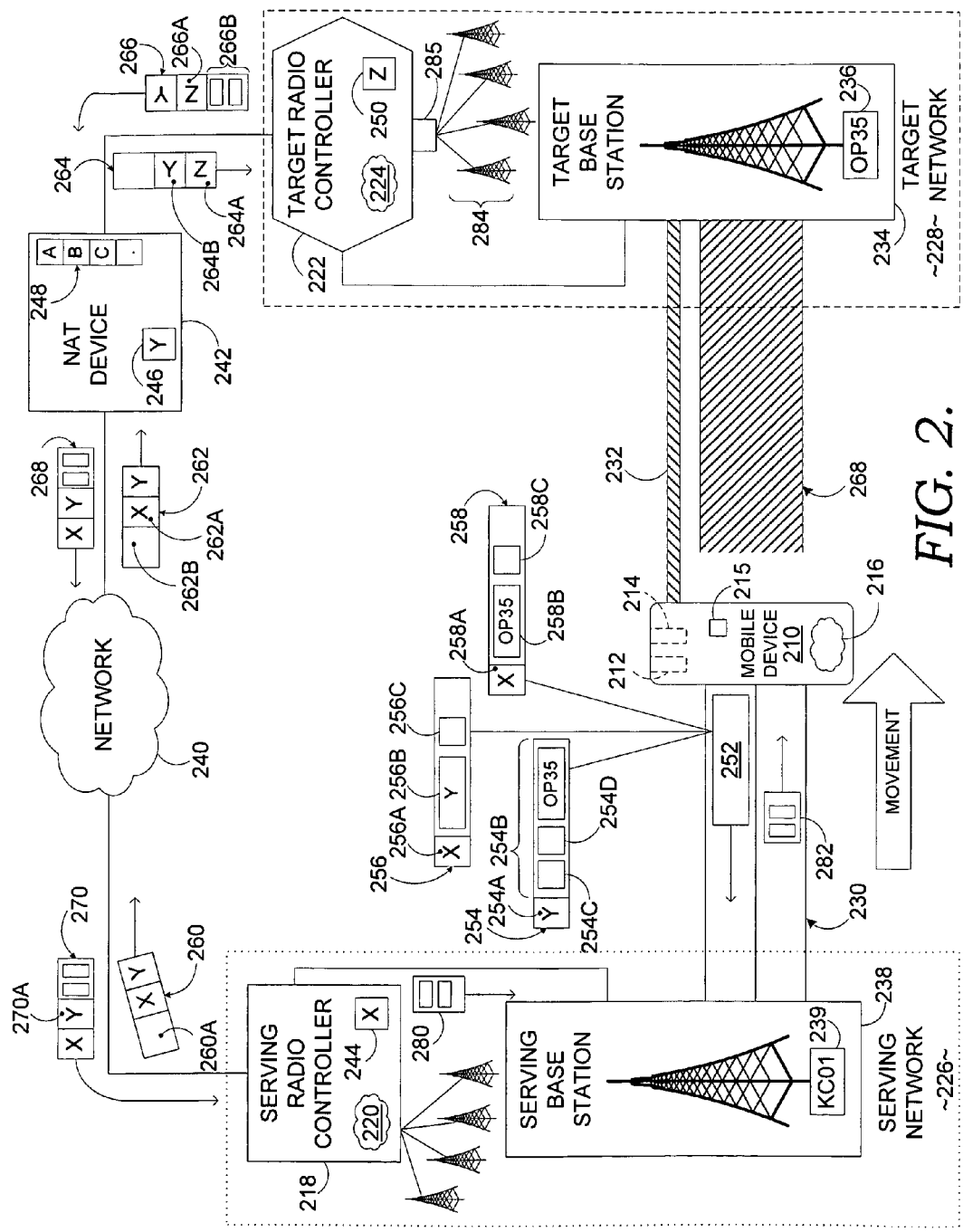
FIG. 2 depicts more detailed aspects of an illustrative operating environment suitable for practicing an embodiment of the present invention.

We will now describe various embodiments of enabling mobile device 110 to preregister with a target network with reference to FIG. 2. Turning now to FIG. 2, a mobile device 210 is shown as including at least two radios 212 and 214. Some lower-level components of various devices are not shown so as to not obscure the present invention. Illustrative lower-level components not shown include memory components of things such as mobile device 210, the radio controllers, the NAT device and the like. Mobile device 210 does include a set of computer-usable instructions 216 that help facilitate various aspects of the invention. Similarly, a serving radio controller 218 includes a set of instructions 220 in one embodiment, as does a target radio controller 222, referenced by number 224.

Two networks are shown: A serving network 226 and a target network 228. As shown, mobile device 210 is currently communicating with serving network 226 by way of a communications channel 230, which might actually include subchannels for upstream and downstream communications. Again, similar to what was depicted in FIG. 1, mobile device 210 is physically moving away from serving network 226 and toward target 228 such that it desires to communicate data through target network 228. But to the extent target network 228 forbids communication from mobile device 210 to occur until mobile device 210 is registered with target network 228, mobile device 210 will not be allowed to communicate data to or through target network 228. The only data that can be received by mobile device 210 at this point, is the data received by way of a broadcast, or pilot, channel 232. Data received by pilot channel 232 indicates the presence of target base station 234, making mobile device 210 aware of the potential to communicate data through target network 228. Target base station 234 is associated with an identifier 236, which in this case, is "OP35." Identifier 236 is shown as a base-station identifier, but other identifiers such as a subnet ID 285 are also possible in other embodiments. Clearly, this illustrative identifier 236 is purely hypothetical and may take on a variety of format forms. We provide an illustrative identifier to help explain an embodiment of the present invention.

Mobile device 210 is currently being serviced by serving network 226. Data flows from mobile device 210 to a serving base station 238, which is associated with an identifier 239. This identifier might take the form of what is traditionally known as a BSID, or might be subnet ID 236. As will be explained, this identifier may be modified to accommodate an embodiment of the present invention. In other embodiments, the base station ID is not changed from its current format.

At a high level, an embodiment of the present invention includes sending a preregistration request through serving network 226 so that it ultimately reaches target radio controller 222 instead of sending a registration request through target network 228. In this way, mobile device 210 will be able to preregister with target network 228 so that substantially immediately upon desiring to communicate with target network 228 it can do so, without having to experience a time delay associated with being admitted onto target network 228, and/or addressed. In some embodiments mobile device 210 identifies a target address to send the preregistration request and also generates the preregistration request.

In other embodiments, mobile device 210 works in concert with serving radio controller 318, which is configured to be able to request resources on behalf of mobile device 210. Thus, in some embodiments, mobile device 210 identifies a target address of a device to send the preregistration request but does not generate the preregistration request, allowing serving radio controller 218 to do that. In still other embodiments, mobile device 210 merely passes onto serving radio controller 218 the BSID 236 of target base station 234. Armed with this data, serving radio controller 218 gleans a target address from BSID 236, generates the preregistration request, and sends it on.

Other components in FIG. 2 include a network 240, which in some embodiments includes the internet or portion thereof.

A NAT (Network Address Translation) device 242 performs network address translation on data received by and passed from itself.

Each of the components are associated with addresses. For example, serving radio controller 218 is associated with an address 244, which is illustratively shown to be "X." NAT device 242 is associated with an address 246, which is illustratively shown to be "Y." Other addresses 248 are also shown in connection with NAT device 242. These other addresses 248 (e.g., A, B, C, etc.) indicate that multiple addresses can be associated with NAT device 242 such that data sent to a variety of addresses can arrive at NAT device 242. This can be accomplished by way of NAT device 242 having various ports either in software or hardware such as cards for example.

Target radio controller 222 is also associated with an address 250, which is illustratively shown to be "Z." We use simple nomenclature such as X, Y, and Z so that discussing aspects of the invention will be easier. We do not mean to convey that actual addresses will take the form of single letters of course. In reality, these addresses will likely take the form of IP addresses, either internal or external addresses, and comport with the various applicable RFCs (Request For Comments) and any other details to comply with a usable addressing scheme.

Mobile device 210 sends a preregistration request 252 to serving network 226. Preregistration request 252 may take on a variety of forms. Three illustrative forms are shown, and referenced by the numerals 254, 256, and 258. A first embodiment is shown in connection with numeral 254. In this embodiment, mobile device 210 gleaned a target address 254A from base station ID 236. That is, mobile device 210 received an indication of a base-station identifier of target base station 234. In one embodiment, this identifier 236 is received by way of pilot channel 232.

Mobile device 210 receives target base-station identifier 236 by way of pilot channel 232 and then determines a target address from the BSID 236. Determining a target address can be accomplished in a variety of ways. For example, a first way might be for instructions 216 to reference a look-up table that indicates a target address where mobile device 210 should send its preregistration request. In another embodiment, instructions 216 inspect BSID 236 itself to determine a target address 254A.

One way of doing this, for example, might involve inspecting the last two bytes of data that are sent along with BSID 236. These last two bytes of data might indicate an address of a target device to which mobile device 210 should send its preregistration request. In still another embodiment, an algorithm might be performed by mobile device 210 on BSID 236 such that the output of the algorithm yields the target address that a preregistration request should be sent.

Thus, information packet 254 includes a target address 254A, which is "y," the address of NAT device 242. Information packet 254 also includes a portion 254B that includes some illustrative data that target radio controller 222 might use to process a preregistration request. Illustrative information that might be sent along in the preregistration request (which, in some embodiments might be portion 254B) includes an identifier 254C that identifies mobile device 210, a request 254D to have various functions performed (such as resource allocation, authentication, and IP-address assignment), and base-station identifier 236, which, in this example is ("OP35.") Mobile-device identifier 254C might take the form of an Electronic Serial Number (ESN) or a Media-Access-Control (MAC) address, or any other identifier that can be used to uniquely identify mobile device 210, such as a phone number in some embodiments. In another embodiment, the preregistration request 252 sent from mobile device 210 might take the form of that shown by reference number 256.

In this example, information packet 256 is bound for serving radio controller 218, as indicated in the "To" field 256A, which indicates a target X, which is the serving radio controller 218. Contents of information packet 256 might include a target address 256B that indicates an address of a target device to which a preregistration request should be sent. Thus, in this embodiment, mobile device 210 gleaned address Y from BSID 236 and is passing that information on to serving radio controller 218, which can use the target address 256B to communicate a preregistration request to NAT device 242. Other information 256C can be included in the next embodiment. Other information 256C might include a request for serving radio controller 218 to create a preregistration request on behalf of mobile device 210 utilizing items such as mobile device identifier 215, which uniquely identifies mobile device 210.

In still another embodiment, mobile device 210 might only pass on BSID 236 to serving radio controller 218, which then determines the correct target address and formulates the preregistration request to be sent to the target address. This is the example illustrated by numeral 258. Numeral 258A "X" indicates that information packet 258 is to be sent to serving radio controller 218. Pay loan information includes BSID 236 (shown by reference numeral 258B) as well as other information 258C, which might include data that indicates that serving radio controller 218 is to compose a preregistration request and send it to a destination address after it computes that destination address based on BSID information 258B.

Whichever embodiment is employed, serving radio controller 218 ultimately passes a preregistration request 260 that is bound for target device 242, which in this case happens to be NAT device 242. Preregistration request 260 is shown as indicating a to address, a from address and a pay loan. The to address is "Y." The from address is "X." And the pay loan is indicated by a blank space 260A. This request 260 is passed through network 240 so that it arrives on the other side as preregistration request 262.

Preregistration request 262 is received by NAT device 242, which in one embodiment performs network address translation so that the actual address 250 of target radio controller 222 is kept secret. Thus, in one embodiment, NAT device 242 inspects relevant portions of packet 262 to determine that the packet should be routed to target radio controller 222. In some embodiments this includes inspecting pay loan 262B and/or from address 262A. NAT device 242 performs its network address translation such as the outbound packet 264 as a new "to" address, Z, referenced by numeral 264A as well as a new "from" address, Y, referenced by numeral 264B. In this way, target radio controller 222 receives packet 264 thinking that it came from NAT device 242, which it did, as indicated by "from" address 264B. In some embodiments, target radio controller 222 makes note of information in packet 264 that can be used to create a return packet 266.

Target radio controller 222 receives packet 264 that includes information necessary to facilitate a preregistration of mobile device 210. In one embodiment, target radio controller 222 performs preregistration of mobile device 210 such that items such as admittance, authentication, and address allocation are performed while mobile device 210 is still being serviced by serving network 226.

In one embodiment, target radio controller 222 returns packet 266, which is now bound for NAT device Y with a "from" address 266A of "Z." Pay loan information 266B is included as part of packet 266. Pay loan information 266B might include a variety of information pieces. Illustrative information pieces might include an indication of a channel that mobile device 210 could use to communicate with second network 228. Thus, when ready, mobile device 210 now knows what channel to use to communicate with target network 228. Because incoming packet 264 included an indication of base station ID 236, target radio controller 222 was able to notify target base station 234 of a channel to be used to communicate with mobile device 210. An illustrative channel is shown by reference numeral 268. Channel 268 is shown as not reaching mobile device 210 yet.

This is merely a way of illustrating that mobile device 210 has not begun communicating data across channel 268. It is illustratively shown as being extended toward mobile device 210 to help indicate that the channel is ready and prepared to receive information from mobile device 210 as soon as mobile device 210 desires to switch over to second network 228. Another piece of information that can be included in pay loan 266B is an indication of an address that mobile device 210 is to have on second network 228. Thus, in one embodiment, pay loan 266B can communicate an IP address that mobile device 210 is to have when it is associated with second network 228.

This packet 266 flows into NAT device 242, which translates the "to" and "from" addresses to that seen in packet 268, which is bound for destination X and is indicated as having come from address Y, the address of NAT device 242. In this way, when serving radio controller 218 receives the packet 270 (passed through network 240) it perceives the packet to have come from NAT device 242, as indicated in the "from" address field 270A.

Serving radio controller 218 passes information 280 through serving base station 238 and on to mobile device 210. The information stemming from base station 238 is indicated by reference numeral 282. With mobile device 210 having received information 282, it is now equipped with enough information to be able to communicate with second network 228 substantially immediately upon its desire to do so. Moreover, second network 228 is now prepared and equipped to receive communications from mobile device 210 so that switching from serving network 226 to target network 228 happens in a very short amount of time; namely, an amount of time that is much less than an amount of time that would have been necessary for mobile device 210 to initially register with second network 228 had it not been able to preregister.

Figure 3:
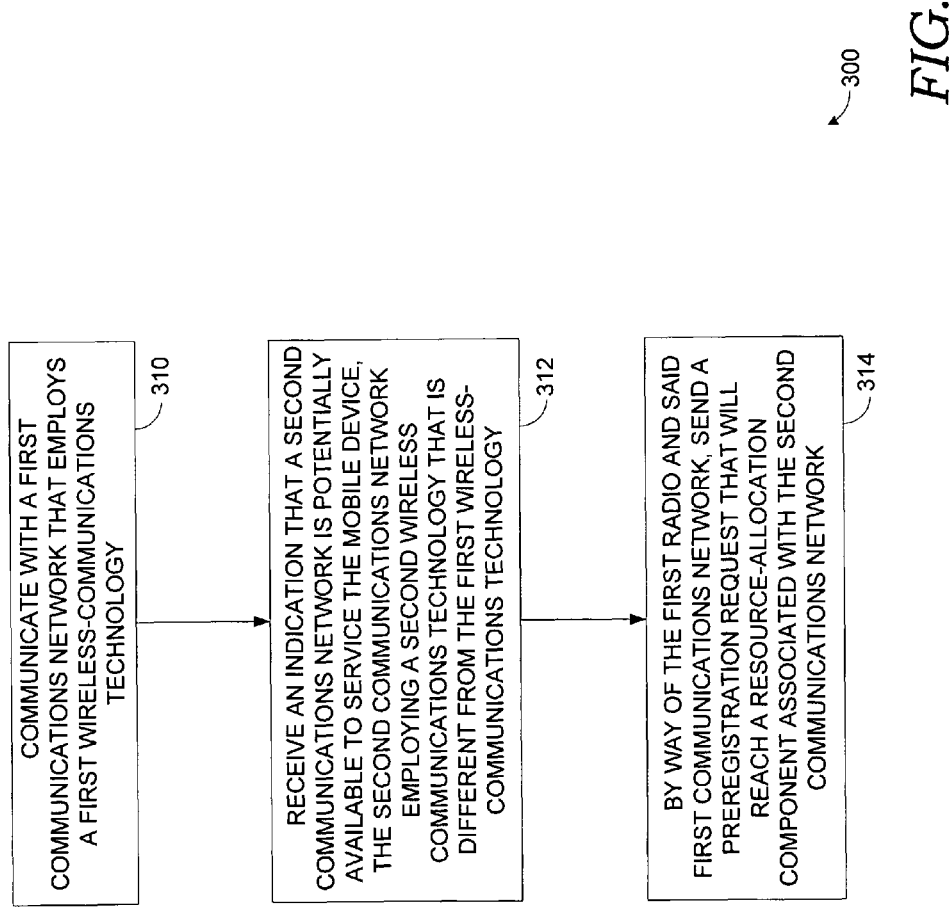
FIGS. 3-5 depicts illustrative methods for carrying out embodiments of the present invention.

Turning now to FIG. 3, an illustrative method for practicing an embodiment of the present invention is provided generally by the numeral 300. At a step 310, communication is happening with a first communications network that employs first wireless-telecommunications technology. Thus, with reference to FIG. 2, mobile device 210 is communicating with first network 226, which is built upon a first technology, such as those that we previously mentioned toward the beginning of this disclosure. In one embodiment, this communication is happening by way of first radio 212 within mobile device 210.

At a step 312, an indication is received that indicates that a second communications network is potentially available to service the mobile device. The second communications network 228 employs a second wireless-communications technology that is different from the first wireless-communications technology. In one embodiment, this indication is received by way of second radio 214.

At a step 314, and by way of the first radio and first communications network, a preregistration request 252 is sent that will ultimately reach a resource allocation component 222 associated with the second communications network. We have referred to target radio controller as reference numeral 222. In one embodiment, target radio controller 222 is a resource-allocation component that is capable of allocating resources that are to be used in connection with serving mobile device 210 once it's ready to be serviced by second network 228. This will enable mobile device 210 to begin communicating through second communications network 228 without having to wait to register with it until it has stopped communicating with the first communications network. Thus, it will not have to stop communicating with serving network 226 in order to begin a registration process with serving network 228. We have previously mentioned that the indication that the second network 228 is potentially available is received by way of a broadcast signal or a pilot channel 232.

We have also explained that there are at least three embodiments by which the information sent from the mobile device 210 may take the form of. It may first take the form of a packet that has gleaned a target address from BSID 236. This target address is sent from a device 210. In another embodiment, the target address (e.g., serving radio controller 218) to which the preregistration request should be sent is determined, and included in a request to generate a preregistration request. In a third embodiment, the base-station identifier itself 236 is sent from mobile device 210 too, for example, serving radio controller 218, which gleans a destination address from BSID 236 and which also generates a preregistration request upon behalf of mobile device 210, and sends it 260 to the determined destination device.

The preregistration request might include various levels of task requests. For example, a preregistration request might include a request for the second communications network to reserve resources that are usable to service mobile device 210. In other embodiments, the preregistration might include the above and/or a request to admit the mobile device onto the second communications network. In still another embodiment, the request might include the above and/or a request to authenticate the mobile device onto second network 228. In still another embodiment, the request might include the above and/or a request to assign an address to the mobile device such that the mobile device will be identifiable to the second communications network. In some embodiments, this address takes the form of an IP address that the second network 228 will use to communicate with mobile device 210.

Figure 4:
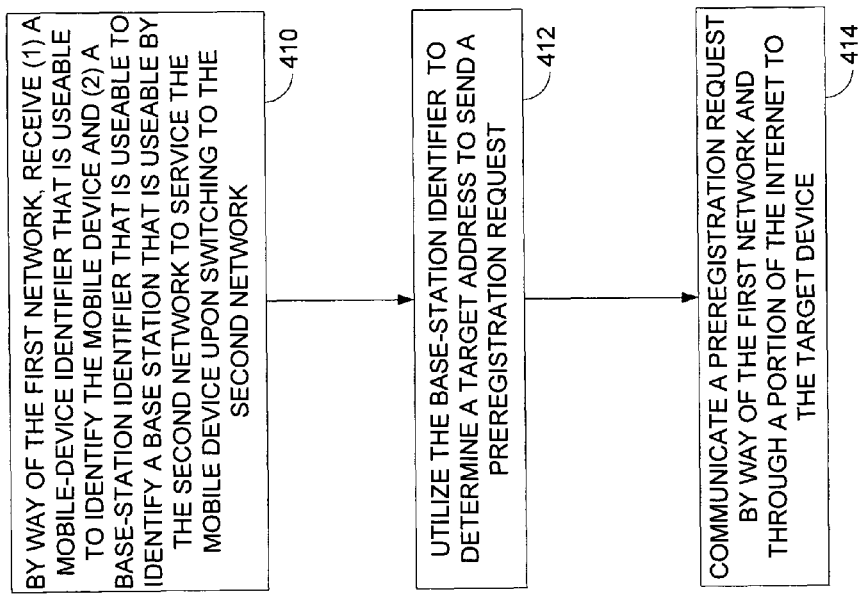

Turning now to FIG. 4, another illustrative method for practicing an embodiment of the present invention is provided. At a step 410, by way of the first network, a mobile-device identifier 215 is received so that it is usable to identify the mobile device and also received is a base-station identifier 236 that is usable to identify a base station that might be used by second network 228 to service mobile device 210 when mobile device 210 wants to switch from serving network 226 to target network 228. This information flows from first network 226 through a network such as that of 240. This is in contrast to the data flowing through second network 228 originally.

At a step 412, the base-station identifier is used to determine a target address "e.g., 254A" to send a preregistration request. Thus, as previously mentioned, the base-station identifier 236 is used to determine an address of a target device such as NAT device 242 that should receive, at least initially preregistration request such as that of 252, which will ultimately be received by a device such as target radio controller 222 that is equipped with an ability to allocate resources and otherwise process a preregistration request.

Thus, at a step 414, a preregistration request is communicated by way of first network 226 and through a portion of the internet (which can be network 240) to the target device.

Thus, the preregistration request can initiate or be used by a preregistration process to preregister mobile device 210. In one embodiment, this preregistration process includes second network 228 allocating resources to service mobile device 210 before mobile device 210 has been allowed onto second communications network 228 but prior to mobile device 210 severing communications with the first network 226. As also mentioned, this preregistration process can include one or more of admitting the mobile device to the second communications network, designating a communications channel through which the mobile device 210 is to utilize to communicate with second network 228, and/or reserving an IP address to be given to mobile device 210 that will be usable by it to communicate with second network 228.

Figure 5:
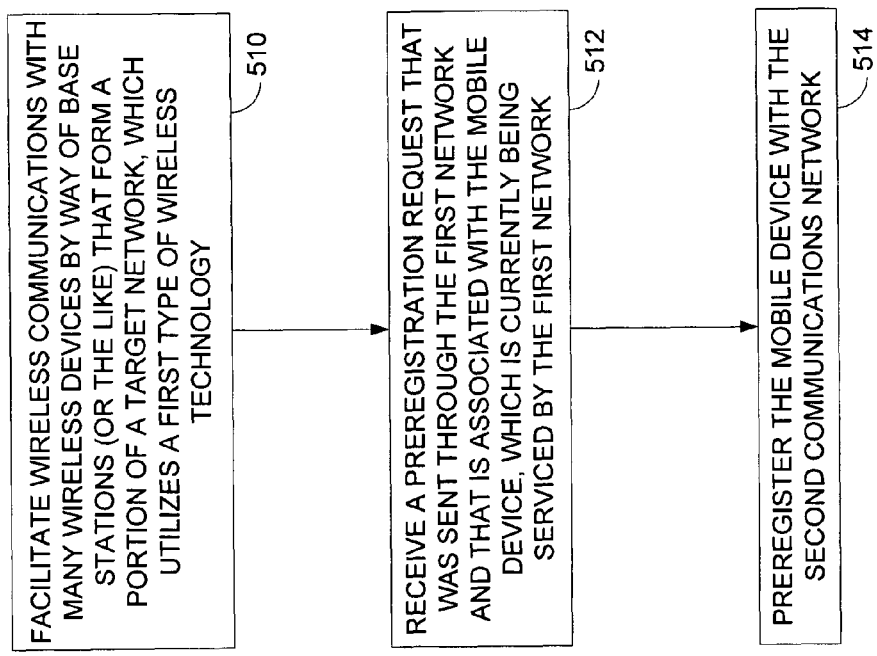

Another illustrative method for carrying out an embodiment of the present invention is provided in FIG. 5. At a step 510, wireless communications are facilitated with many wireless devices by way of one or more base stations (234 as well as 284) that form a portion of a target network 228. The target network utilizes a first type of wireless technology, which is different than that of a serving network 226 in one embodiment.

At a step 512, a preregistration request is received that was sent through first network 226 and that is associated with mobile device 210, which is currently being serviced by first network 226. In one embodiment, the preregistration request 252 includes identifying information that is usable to identify mobile device 210 and further includes a request to prepare the second network to service the mobile device. As mentioned, in some embodiments, the preregistration request was received from a sending device (e.g., serving radio controller 218) that receives information usable to create the preregistration request.

In one embodiment, the preregistration request was received from a sending device (e.g., NAT device 242) that received the preregistration request. The address of the sending device was discernable by inspecting a base-station identifier such as 236 that the mobile device was made aware of, by, for example, pilot channel 232.

In one embodiment, the preregistration request is ultimately received by a radio controller within second network 228. An address of the sending device (e.g. NAT device 242) is known by a device external to second network 228, but the address of the radio controller is not made known to devices that are not part of second network 228.

In some embodiments, mobile device 210 is actually preregistered (e.g., step 514) with second communications network 228. This can happen by second network 228 being prepared to service the mobile device; namely by allocating the appropriate resources, authenticating mobile device 210, and/or providing an address of mobile device 210 so that it will be identifiable by second network 228.

Given the instant invention, target radio controller 222 will now service registration requests from two sources: its wireless resources, e.g., base stations 284 and 234; as well as though an out-of-band type of pathway, such as through a portion of the internet not in connection with its wireless resources.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media having computer-useable instructions embodied thereon for performing a method of discovering communications-network resources to facilitate preregistration of a mobile device that has a first radio and a second radio, each equipped to communicate with networks of a first wireless-communications technology and a second wireless-communications technology respectively, the method comprising:
   communicating, by way of the first radio, with a first communications network that employs the first wireless-communications technology;
   receiving, by way of the second radio, an indication that a second communications network is available to potentially service the mobile device, wherein the second communications network employs the second wireless-communications technology that is different from the first wireless-communications technology;
   sending, by way of the first radio and the first communications network, a preregistration request to a resource-allocation component associated with the second communications network, wherein the resource-allocation component allocates resources within the second communications network to service the mobile device via the second radio, wherein the second network services the mobile device without the mobile device separately registering with the second network; and
   communicating, by way of the second radio, through the second communications network without having to wait to register with the second communications network.

2. The media of claim 1, wherein the first wireless-communications technology utilizes a wireless-access technology that is natively incompatible with the second wireless-communications technology.

3. The media of claim 1, wherein the first wireless-communications technology utilizes TDMA (Time Division Multiple Access), and wherein second wireless-communications technology utilizes one FDMA (Frequency Division Multiple Access) or OFDMA (Orthogonal Frequency-Division Multiple Access).

4. The media of claim 1, wherein the first wireless-communications technology is a CDMA (Code Division Multiple Access) technology and the second wireless-communications technology is one of a GSM (Global System for Mobile Communications) or GPRS (General Packet Radio Service) technology.

5. The media of claim 1, wherein the first wireless-communications technology is a CDMA (Code Division Multiple Access) technology and the second wireless-communications technology is compatible with an IEEE 802.16 standard.

6. The media of claim 1, wherein the indication that the second communications network is potentially available is received via a broadcast signal sent from a base station of the second wireless-communications network, the base station being associated with a base-station identifier or a subnet identifier.

7. The media of claim 6, wherein sending the preregistration request includes at least one of the following:
- gleaning a target address from at least one of the base-station identifier or the subnet identifier, the target address identifying an address to which the preregistration request should be sent, and communicating the target address to a network component in the first network that generates the preregistration request to be sent to the target address; or
- passing at least one of the base-station identifier or the subnet identifier to the network component in the first network that gleans the target address from the at least one of the base-station identifier or the subnet identifier and that generates the preregistration request to be sent to the target address.

8. The media of claim 7, wherein gleaning the target address is accomplished by one or more of the following ways:
- inspecting the at least one of the base-station identifier or the subnet identifier, determining that a portion of the base-station identifier is designated for indicating the target address, and translating the portion into the target address; and
- referencing a look-up table that matches the target address to the at least one of the base-station identifier or the subnet identifier.

9. The media of claim 8, wherein the NAT device is reachable by way of multiple and different target addresses such that data directed to the multiple and different addresses still reaches the NAT device.

10. The media of claim 7, wherein the preregistration request includes one or more of the following:
- a request for the second communications network to reserve resources that are useable to service the mobile device;
- a request to admit the mobile device onto the second communications network;
- a request to authenticate the mobile device; or
- a request to assign an address to the mobile device such that the mobile device is identifiable to the second communications network.

11. The media of claim 7, wherein the target address is useable to direct the preregistration request to a network-address-translation (NAT) device.

12. One or more nontransitory computer-readable media having computer-useable instructions embodied thereon for performing a method of facilitating preregistration of a mobile device with a second network while it is being serviced by a first network, which operates using a different wireless technology than the second network, the method comprising:
- receiving from the mobile device by way of the first network:
  - (A) a mobile-device identifier that is useable to identify the mobile device, and
  - (B) a second identifier including at least one of a base-station identifier or a subnet identifier that is useable to respectively identify a base station or a subnet that is useable by said second network to service the mobile device upon switching to the second network;
- at a device associated with the first network, utilizing the second identifier received from the mobile device to determine a target IP address of a target device in the second network to which a preregistration request is to be sent by way of the first network and through a portion of the internet; and
- communicating the preregistration request by way of the first network and through the portion of the internet to the target device by way of the target IP address, wherein the target device is adapted to facilitate at least a portion of a preregistration process, wherein the preregistration process includes allocating resources that are to be used by the second network to service the mobile device without the mobile device having to separately register with the second network.

13. The media of claim 12, wherein the mobile-device identifier includes one or more of an Electronic Serial Number (ESN), phone number, or Media Access Control (MAC) address.

14. The media of claim 12, wherein the communicating the preregistration request occurs by a process that includes one of the following:
- receiving the target IP address that identifies an address to which the preregistration request should be sent, and sending the preregistration request to the target IP address;
- receiving the identifier, gleaning the target IP address from the identifier, the target IP address identifying the address to which the preregistration request should be sent, and sending the preregistration request to the target IP address; or
- receiving the identifier, gleaning the target IP address from the identifier, generating the preregistration request, and sending it to the target IP address.

15. The media of claim 12, wherein the preregistration process includes the second communications network allocating resources to service the mobile device before the mobile device has been allowed onto the second communications network but prior to severing communications with the first communications network.

16. The media of claim 12, wherein the preregistration process includes admitting the mobile device to the second communications network before the mobile device has severed communications with the first communications network.

17. The media of claim 12, wherein the allocating resources includes one or more of:
- designating a communications channel through which the mobile device is to utilize to communicate with the second communications network; and
- reserving an IP address to be given to the mobile device that will be useable by the second communications network to identify the mobile device.

18. A method of enabling preregistration with a second network a mobile device that is currently being serviced by a first network that utilizes a first wireless-communications technology that is different than a second wireless communications technology that is utilized by the second network, the method comprising:
- facilitating wireless communications with a plurality of wireless devices by way of one or more base stations that form a portion of the second network, which utilizes the second type of wireless-communications technology;
- receiving at a device within the second network, by way of a portion of the internet, and not by way of the second wireless communications technology that is utilized by the second network, a preregistration request that was sent through the first network and that is associated with the mobile device, which is currently being serviced by the first network, the preregistration request including identifying information that is useable to identify the mobile device and further including a request to prepare the second network to service the mobile device.

19. The method of claim 18, wherein the preregistration request was received from a sending device that received the preregistration request, the address of the sending device being discernable by inspecting a base-station identifier of one of the one or more base stations that the mobile device was made aware of.

20. The method of claim 19, wherein the receiving occurs at a radio controller within the second communications network, and an address of the sending device is known by devices external to the second communications network, but an address of the radio controller is not made known to devices that are not part of the second communications network.

21. The method of claim 18, wherein the request to prepare the second network to service the mobile device results in an allocation of a communications channel that is useable by the mobile device to communicate with the second network without the mobile device having to make a request to utilize the second communications network after severing communications with the first communications network.

22. The method of claim 18, further comprising preregistering the mobile device with the second communications network.

\* \* \* \* \*